United States Patent
Tomky et al.

(10) Patent No.: US 10,620,672 B2
(45) Date of Patent: Apr. 14, 2020

(54) LOW PROFILE DEVICE HINGE ASSEMBLY

(71) Applicant: Microsoft Technology Licensing, LLC, Redmond, WA (US)

(72) Inventors: Brett A. Tomky, Seattle, WA (US); Daniel C. Park, Woodinville, WA (US); Nicholas Wendt, Redmond, WA (US); Katherine M. Bailey, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/837,251

(22) Filed: Dec. 11, 2017

(65) Prior Publication Data

US 2019/0179376 A1    Jun. 13, 2019

(51) Int. Cl.
| | | |
|---|---|---|
| H05K 5/00 | (2006.01) | |
| G06F 1/16 | (2006.01) | |
| F16M 13/00 | (2006.01) | |
| F16C 11/10 | (2006.01) | |
| E05D 3/12 | (2006.01) | |
| E05D 11/08 | (2006.01) | |
| E05D 3/18 | (2006.01) | |

(52) U.S. Cl.
CPC ............ *G06F 1/1681* (2013.01); *E05D 3/12* (2013.01); *E05D 3/183* (2013.01); *E05D 11/082* (2013.01); *F16C 11/103* (2013.01); *F16M 13/005* (2013.01); *G06F 1/1626* (2013.01); *G06F 1/1647* (2013.01); *E05Y 2900/606* (2013.01)

(58) Field of Classification Search
CPC ........................................................ G06F 1/16
USPC .................................................. 361/679.01
See application file for complete search history.

(56) References Cited

U.S. PATENT DOCUMENTS

| | | | |
|---|---|---|---|
| 9,304,549 B2 | 4/2016 | Siddiqui | |
| 9,317,072 B2 | 4/2016 | Park et al. | |
| 9,404,298 B1* | 8/2016 | Chen .................... | G06F 1/1681 |
| 9,518,414 B1 | 12/2016 | Chen et al. | |
| 9,549,479 B2 | 1/2017 | Gault et al. | |
| 9,703,327 B2 | 7/2017 | Sprenger et al. | |
| 9,822,567 B1* | 11/2017 | Lin ...................... | E05D 11/06 |
| 2012/0175478 A1* | 7/2012 | Chen .................... | G06F 1/1624 |
| | | | 248/286.1 |
| 2014/0304948 A1* | 10/2014 | Onda .................... | E05D 11/082 |
| | | | 16/342 |
| 2015/0277505 A1 | 10/2015 | Lim et al. | |

(Continued)

FOREIGN PATENT DOCUMENTS

TW    M537244 U    2/2017

OTHER PUBLICATIONS

"International Search Report and Written Opinion Issued in PCT Application No. PCT/US2018/063499", dated Mar. 6, 2019, 20 Pages.

*Primary Examiner* — Jerry Wu
(74) *Attorney, Agent, or Firm* — Rainier Patents, P.S.

(57) ABSTRACT

The description relates to hinged devices, such as hinged computing devices. One example can include a first portion and a second portion that are rotatably coupled by a hinge assembly. The hinge assembly can include a hinge frame secured to the first portion and a hinge arm secured to the second portion. The hinge frame can be rotatably secured to the hinge arm by a band extending between a guide pin retained in the hinge frame and a friction pin secured to the hinge arm.

17 Claims, 10 Drawing Sheets

(56) References Cited

U.S. PATENT DOCUMENTS

| | | | |
|---|---|---|---|
| 2016/0083989 A1* | 3/2016 | Kuo | ............... E05D 1/04 16/355 |
| 2016/0130849 A1 | 5/2016 | Cheah et al. | |
| 2016/0224071 A1 | 8/2016 | Knepper et al. | |
| 2017/0284457 A1 | 10/2017 | Park | |
| 2017/0344067 A1 | 11/2017 | Lan et al. | |

* cited by examiner

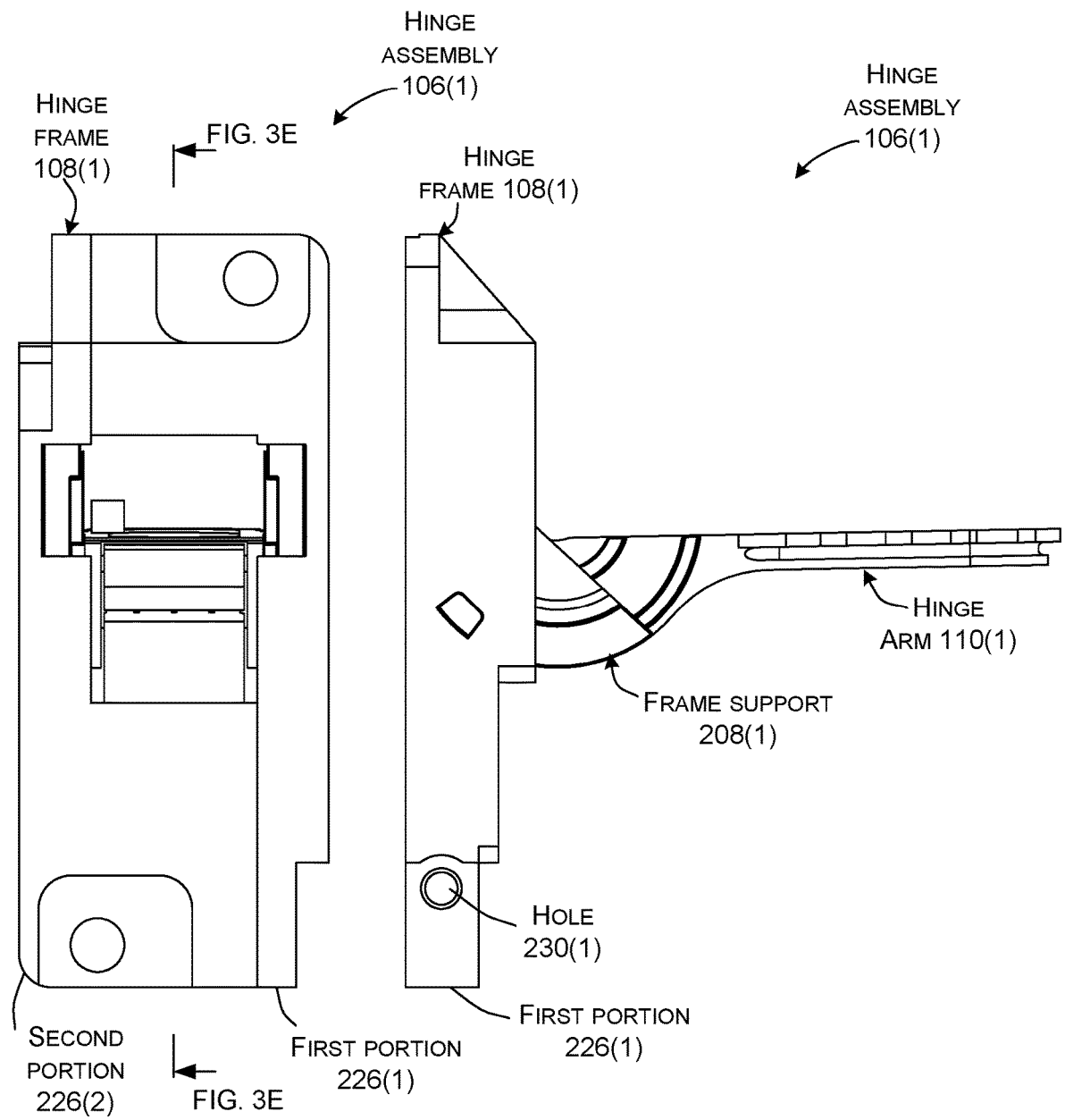

LOW PROFILE DEVICE HINGE ASSEMBLY

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

FIGS. 2E, 2F, 3C, 3D, 4C, and 4D show elevational views of example devices in accordance with some implementations of the present concepts.

FIGS. 2G, 3E, and 4E show sectioned views of example devices in accordance with some implementations of the present concepts.

DESCRIPTION

The present concepts relate to devices, such as computing devices employing hinge assemblies that can rotationally secure first and second device portions. Consumers tend to favor thin devices, such as laptops, tablets, and smart phones. The hinge assemblies can satisfy the consumers' desire for thinness while satisfying other design parameters, such as ease of opening and closing. These and other aspects are described below.

Figure 1:
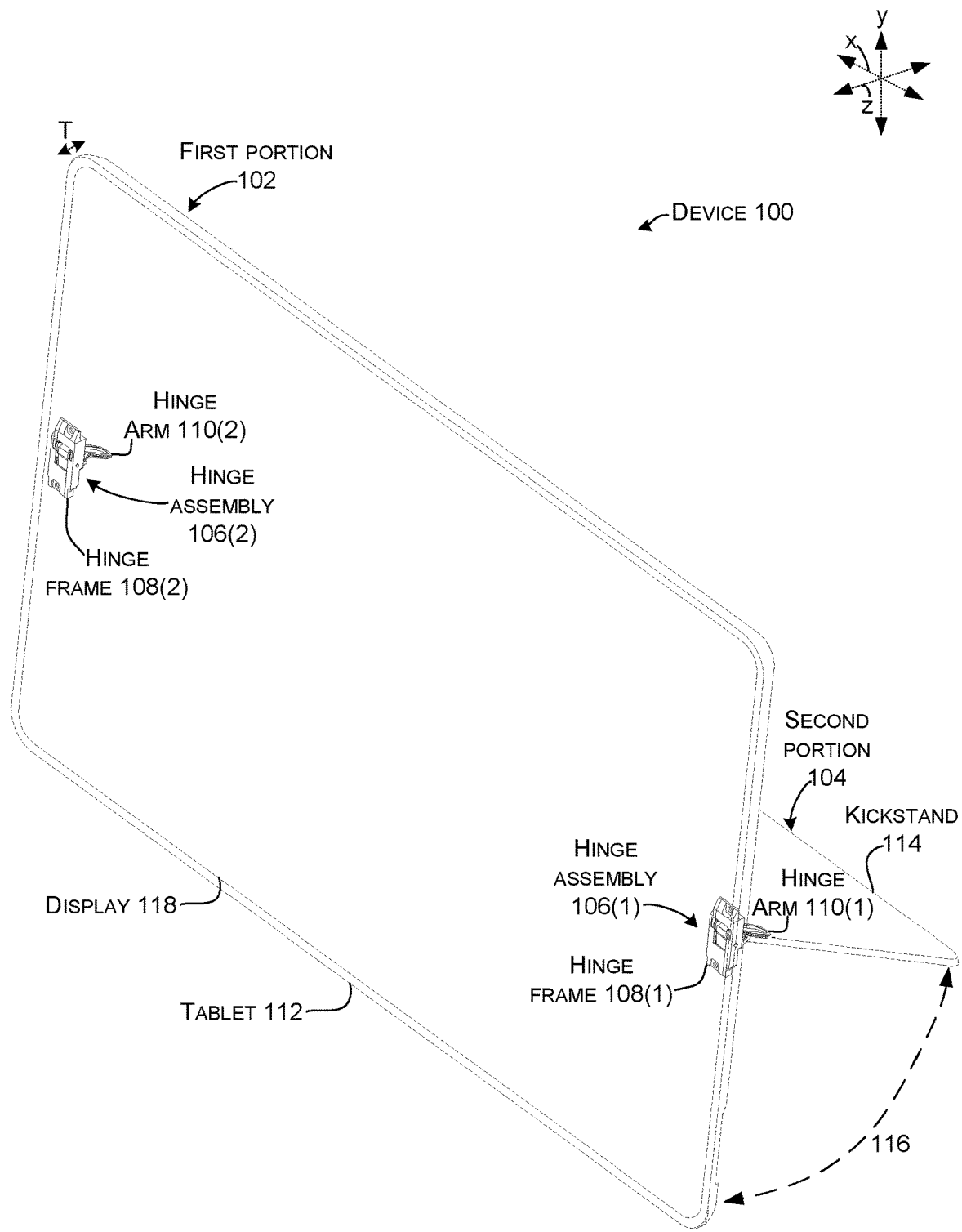
FIGS. 1, 2A, 2C, 3A, 3B, 4A, and 4B show perspective views of example devices in accordance with some implementations of the present concepts.

Introductory FIG. 1 shows an example device 100 that has first and second portions 102 and 104 that are rotatably secured together by a hinge assembly 106. In this case, two hinge assemblies 106(1) and 106(2) can operate cooperatively to rotatably secure the first and second portions. Other implementations can use a single hinge assembly or more than two hinge assemblies. In the illustrated configuration, the hinge assemblies 106 include a hinge frame 108 and a hinge arm 110. The hinge assemblies 106 can be secured to the first portion 102 via the hinge frame 108. The hinge assemblies 106 can be secured to the second portion 104 via the hinge arm 110.

In the illustrated configuration, the first portion 102 is manifest as a tablet 112 (e.g., tablet type computing device) and the second portion 104 is manifest as a kickstand 114 for the tablet 112. The kickstand is illustrated rotated at the hinge assemblies 106 to an open orientation of about 85°. The hinge assemblies 106 can allow the kickstand to be rotated through a range of rotation 116 that includes a closed position against the tablet 112 (zero degrees) and other open angles.

Beyond the illustrated tablet configuration, in other implementations, the first and second portions 102 and 104 can be manifest as other form factors. For instance, the first and second portions could be manifest as the input side and display side of a notebook computing device. In another example, the first and second portions could be manifest as two sides of a foldable smart phone or a wearable smart device. In one such example, either or both of the first and second portions can include a display 118 and/or multiple displays.

Tablet 112 provides an example of a device that is space constrained in at least one direction. In the case of tablets, notebooks, and/or smart phones, the market prefers ever thinner devices as represented by thickness T (e.g., parallel to the z-reference direction). Hinge assemblies 108 include features that lend themselves to space constrained applications. Some of these features are illustrated below relative to FIGS. 2A-4E.

Figure 2A:
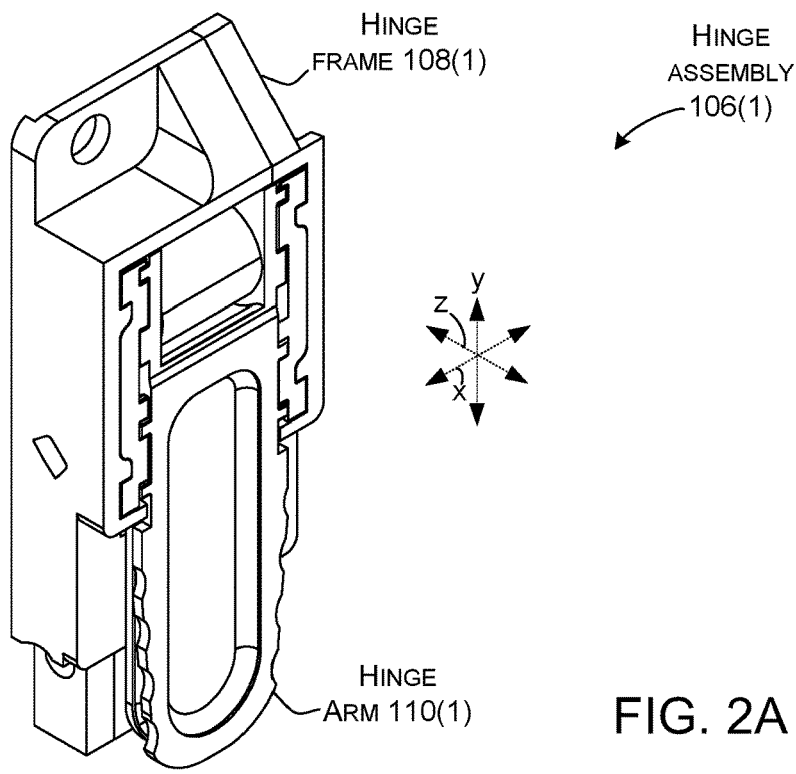
Figure 2B:
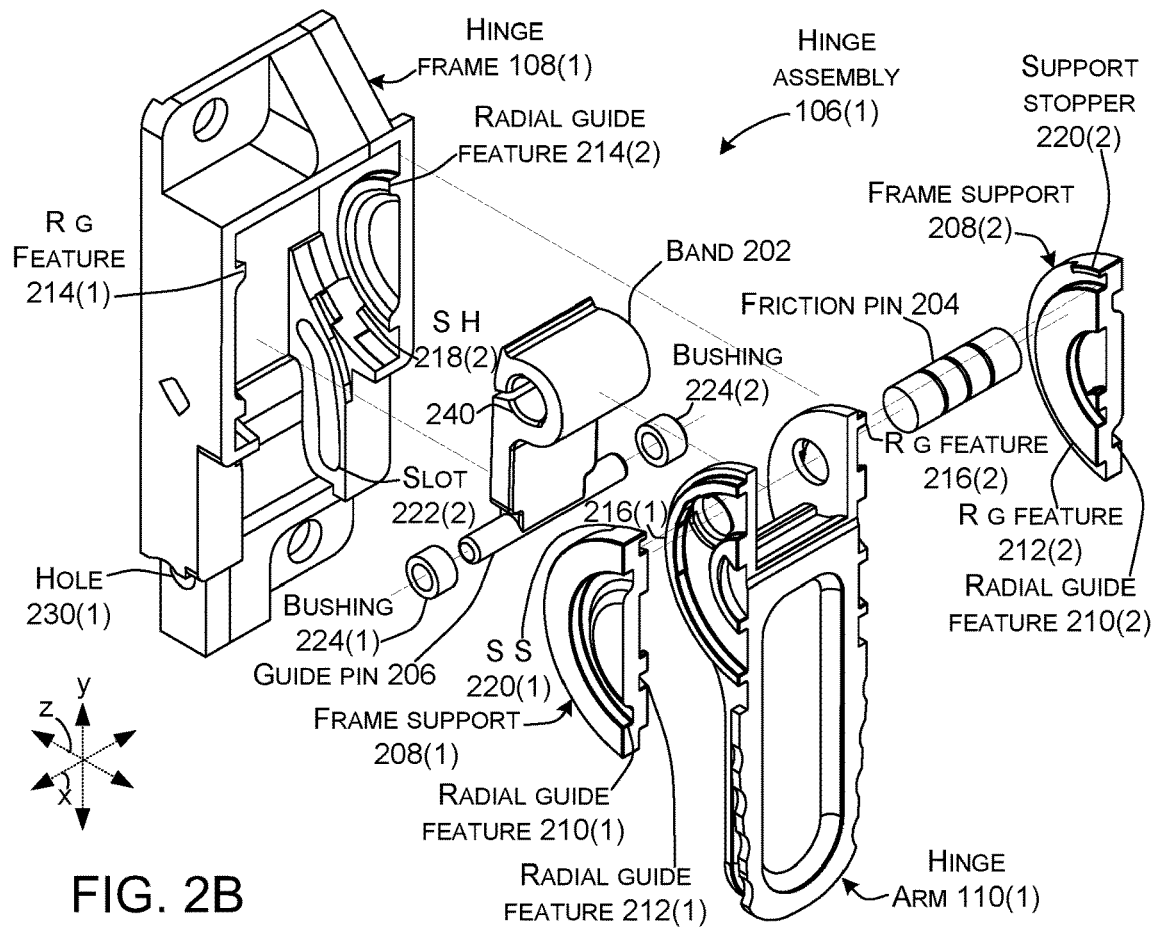
FIGS. 2B and 2D show exploded perspective views of example devices in accordance with some implementations of the present concepts.
Figure 2C:
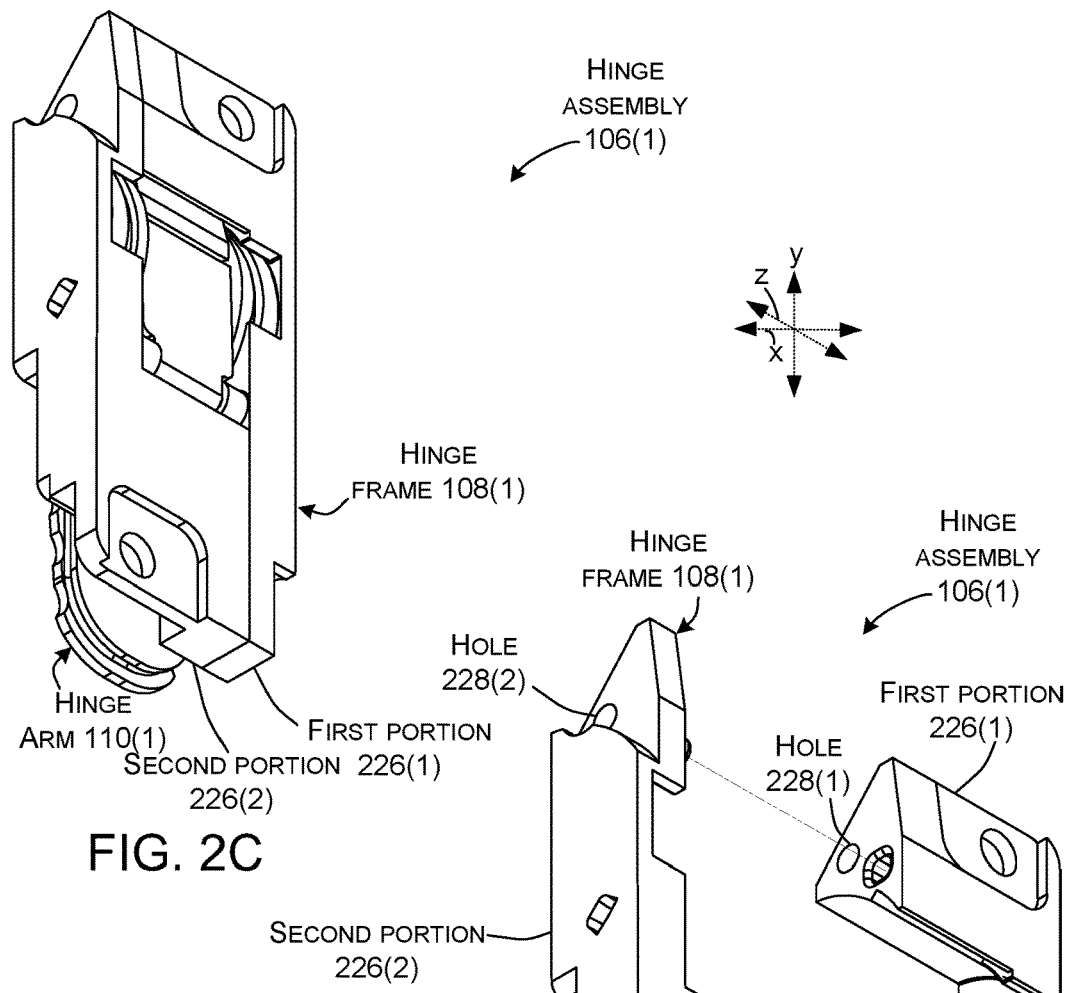
Figure 2D:
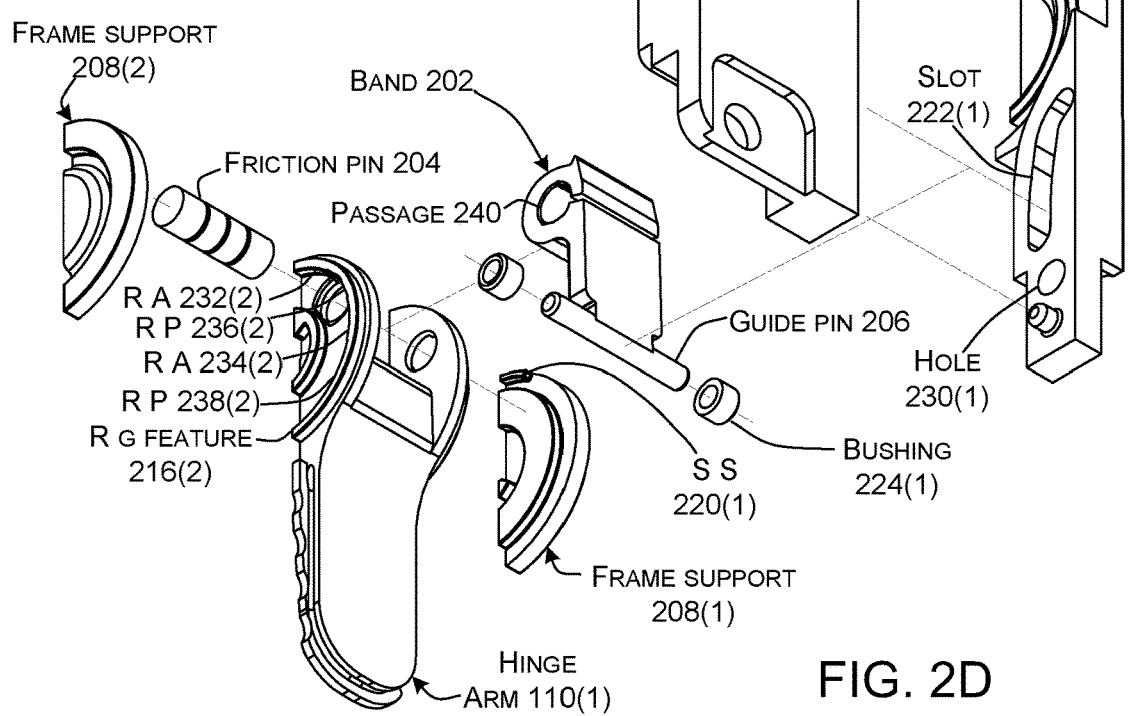
Figures 2E, 2F, 2G:
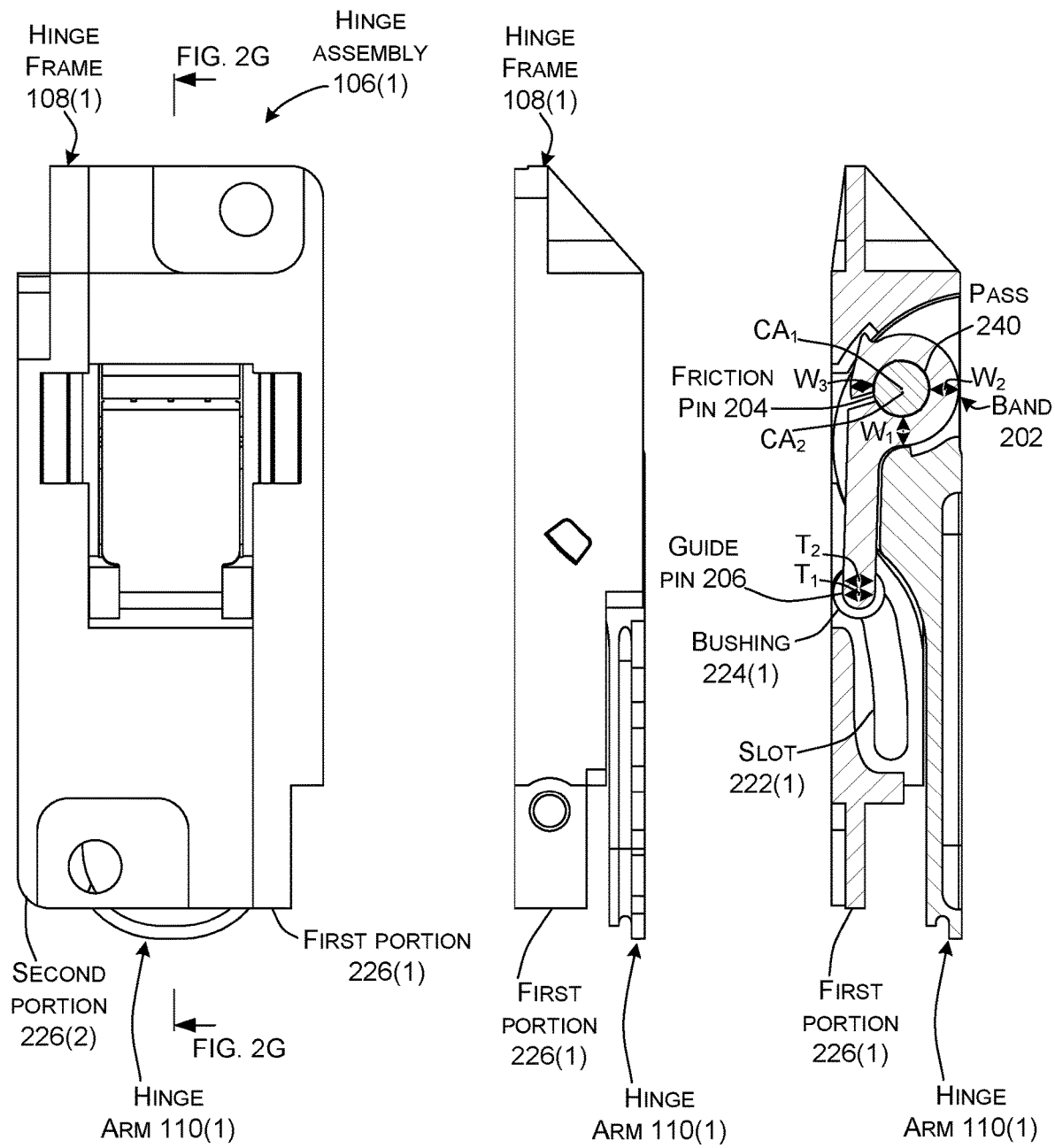
Figure 3A:
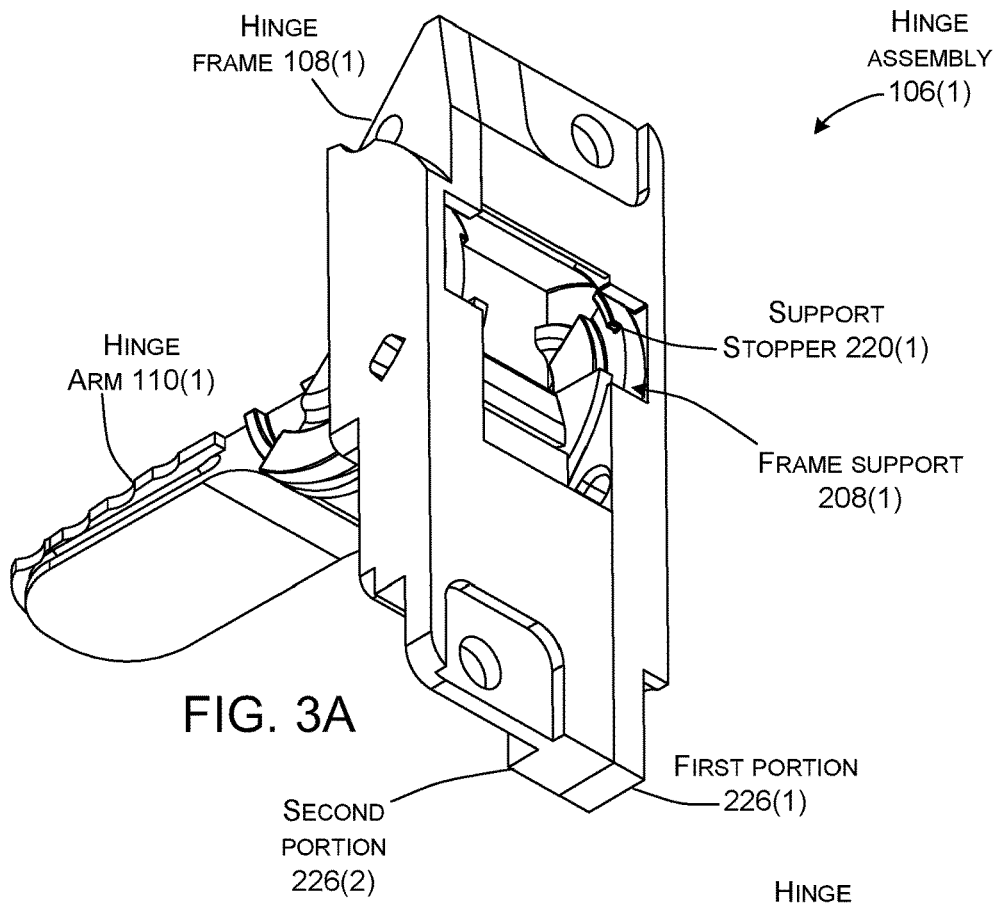
Figure 3B:
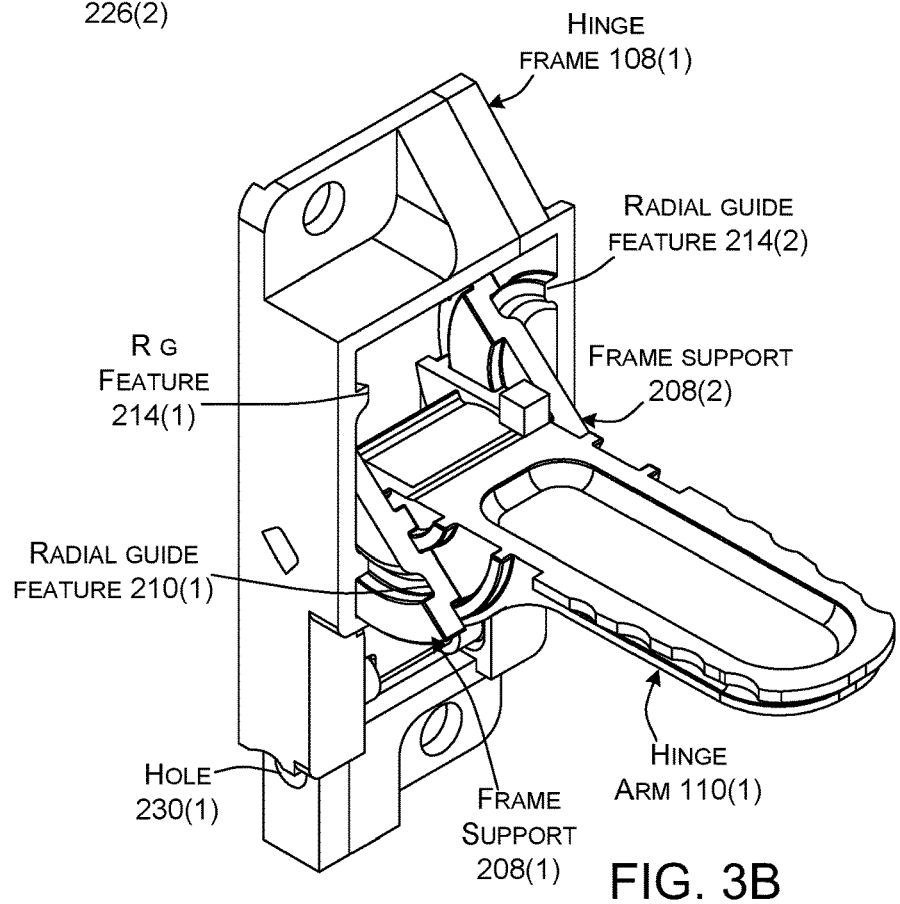
Figure 3E:
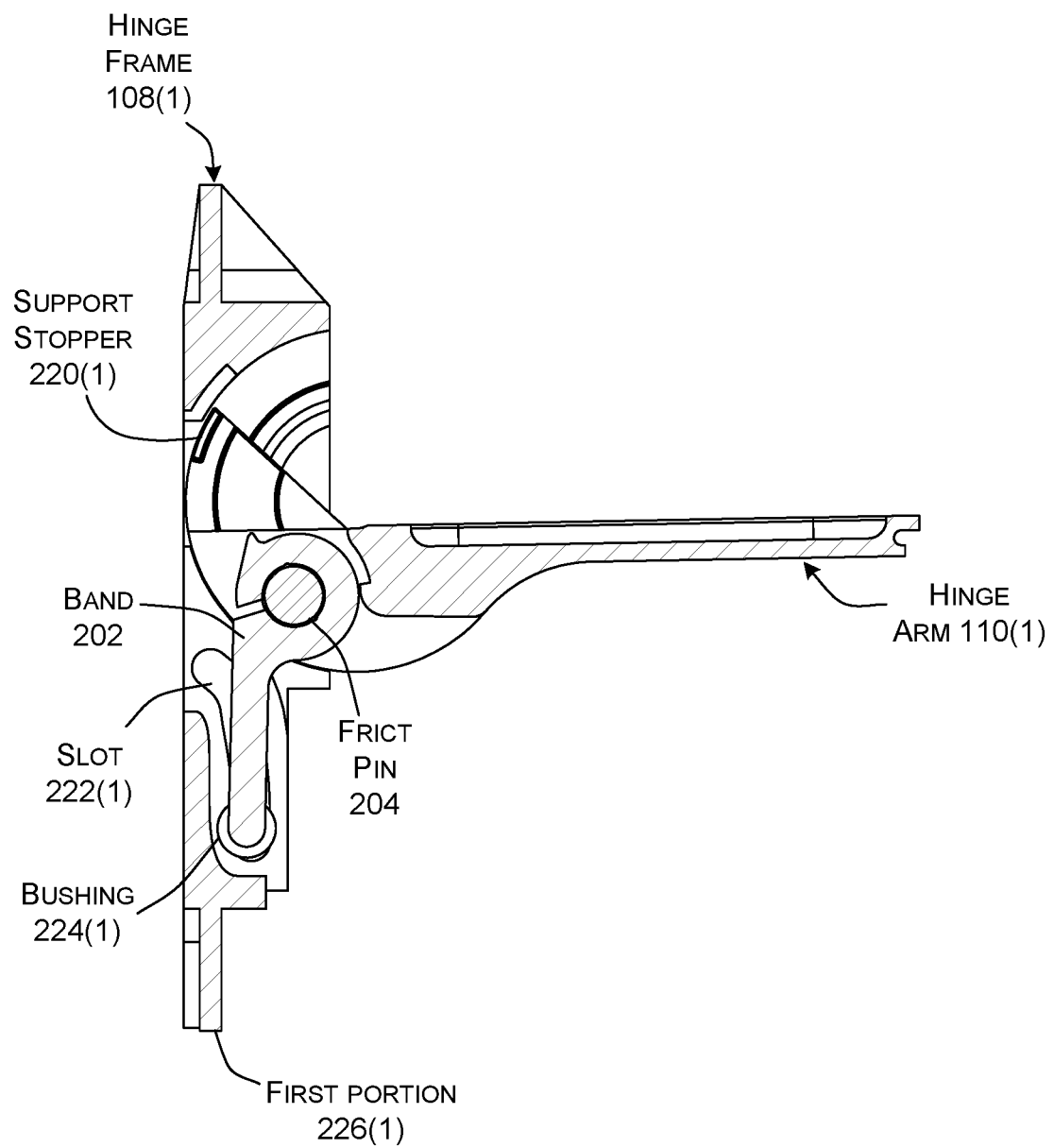

FIGS. 2A-2G, 3A-3E, and 4A-4E collectively show more detailed views of hinge assembly 106(1). FIGS. 2A-2G show the hinge assembly in the closed orientation. FIGS. 3A-3E show the hinge assembly in a partially open orientation. FIGS. 4A-4E show the hinge assembly in a fully open orientation. FIGS. 2A and 2B show the hinge arm facing toward the viewer and FIGS. 2C and 2D show the hinge arm facing away from the viewer. FIGS. 2E and 2F are elevational views of the hinge assembly and FIG. 2G is a sectional view as indicated in FIG. 2E. FIGS. 3A and 3B and 4A and 4B are similar to FIGS. 2A and 2C, respectively. FIGS. 3C, 3D, and 3E and 4C, 4D, and 4E are similar to FIGS. 2E, 2F, and 2G, respectively.

In this implementation, the hinge assembly 106(1) can include a band 202 that extends from a friction pin end to a guide pin end. The hinge assembly can also include a friction pin 204, a guide pin 206, and frame supports 208(1) and 208(2). In this case, the friction pin 204 rotationally secures the band 202 to the hinge arm 110(1). Frame supports 208 are radially retained between the hinge arm 110(1) and the hinge frame 108(1). Specifically, the frame supports 208 define radial guide features 210 facing the hinge frame 108(1) and radial guide features 212 facing the hinge arm 110(1). The hinge frame 108(1) defines inwardly-facing radial guide features 214 and the hinge arm 110(1) defines outwardly-facing radial guide features 216. The frame support's radial guide features 210 engage the hinge frame's radial guide features 214 and the frame support's radial guide features 212 engage the hinge arm's outwardly-facing radial guide features 216.

The hinge frame 108(1) can also define a support hook 218 associated with the hinge frame's radial guide features 214. The support hook 218 can extend over and capture the frame support 208. The support hook 218 can allow radial rotation of the frame support 208 relative to the hinge frame 108(1) (e.g., rotation of the frame support around the x reference axis) while preventing other frame support 208 motion. For instance, the frame support can be prevented from tipping (e.g., rotating around the y reference axis) and/or otherwise moving. The support hook 218 can interact with a support stop or stopper 220 on the frame support 208 to define the extent or range (e.g., number of degrees) of rotation of the hinge arm 110(1) relative to the hinge frame 108(1).

The hinge frame 108(1) can define elongate guide slots 222. The guide pin 206 can be retained in, and travel along, the guide slots 222. In this implementation, bushings 224 are positioned on the guide pin 206. The bushings 224 can roll around the guide pin 206 as the guide pin travels along the guide slots 222. The bushings 224 can reduce friction and/or reduce wobbling (e.g., twisting of the hinge arm 110(1) around the y-reference axis relative to the hinge frame 108(1)).

In the illustrated implementation, the guide slots 222 are carefully shaped to achieve an enhanced and potentially ideal torque profile. The first part of the guide slots encountered in the closed orientation can be shaped to minimize the rotation of the band 202 around the friction pin 204, such that the kickstand torque is low for easy opening.

The portion of the guide slots 222 engaged when the hinge assembly 108(1) is in the fully open orientation is carefully shaped to prevent locking or jamming. The shape of the guide slots 222 is curved such that the torque does not increase in case of the guide pin 206 travels beyond its nominal max open position. Stated another way, in this case, the guide slots are elongate and are curvilinear along their length. In other implementations, the guide slots can be linear, while in still other implementations, the guide slots can have linear segments joined by transition regions.

In the illustrated implementation, the hinge frame 108(1) can be a split frame configuration that includes a first frame portion 226(1) and a second frame portion 226(2). FIG. 2D shows the first and second frame portions 226 separated from one another, while the other views show the first and second frame portions assembled. The first frame portion 226(1) and the second frame portion 226(2) can be secured together with fasteners (not shown) through holes 228 and 230.

Employing a split hinge frame can allow assembly of the elements of the hinge assembly from first frame portion 226(1) toward, and finalizing with, second frame portion 226(2). For instance, band 202 can be assembled on hinge arm 110(1) with friction pin 204. The hinge arm can be fitted to the frame supports 208. This 'assembly' can be fitted to second frame portion 226(2) so that the guide pin 206 is positioned in guide slot 222(2). Finally, the first frame portion 226(1) can be fitted to the second frame portion 226(2) to sandwich the assembly in between. Thus, the guide pin 206 can be slideably retained in the hinge frame by opposing elongate guide slots 222(1) and 222(2) defined by the hinge frame portions 226(1) and 226(2), respectively. The first and second frame portions 226 can be fastened together to retain the intervening elements (of the assembly).

This two-part hinge frame configuration eliminates the need to remove material from the hinge frame 108 so that elements can be assembled through the hinge frame. The removed material tends to weaken the hinge frame and thus retaining the material can result in a stronger hinge frame compared to previous solutions.

Stated another way, the two piece or split hinge frame configuration avoids having to leave openings in the hinge frame to pass elements through. For instance, the guide slots 222 can be blind slots that do not pass all the way through the material of the hinge frame 108(1). With blind guide slots, once the first and second frame portions 226 are assembled, the guide pin 206 is trapped and cannot slide out of the guide slot 222, such as in the x-reference direction. In some cases, the first and second portions of the split frame define sidewalls into which the guide slots 222 are formed. The sidewalls can be continuous and without features formed therethrough. Thus, the sidewalls include the guide slots, but the guide slots are blind (e.g., do not pass all the way through the sidewalls). Accordingly, the strength of the hinge frame is not diminished by the removal of material for pass through features.

As introduced above, the split hinge frame 108(1) can allow the hinge assembly 106(1) to be built up from one side (like a sandwich). The guide pin 206 can be integrated into the band 202, reducing cost and also reducing the z-height. For instance, the guide pin and the band can be formed as a single integral component or can be secured together to produce a single integral component. In contrast, a single piece hinge frame design requires inserting the guide pin 206 into the band 202 after hinge assembly. In these previous configurations, the band had to be expanded to allow a hole to be formed through the band to receive the guide pin. As such, by definition, the thickness of the band in the z direction at the guide pin had to be larger than the guide pin itself. In contrast, the present implementations can allow the thickness (e.g., diameter) $T_1$ (see FIG. 2G) of the guide pin to be equal to (or greater than) the thickness $T_2$ of the band proximate to the guide pin. Stated another way, unlike previous designs where the band surrounded the guide pin, the guide pin 206 can be integrated into the band 202. This can reduce the z-height and y-length required, since extra clearance is not needed for band material to wrap around and retain the guide pin.

In the illustrated implementation, each frame portion 226 of the split hinge frame 108(1) can contain radial guide features 214. For instance, radial guide feature 214(1) is defined by first frame portion 226(1) and radial guide feature 214(2) is defined by second frame portion 226(2). In previous designs, these features had to be cast at the parting line of the production tool, increasing dimensional variation. The split hinge frame can allow the radial guide features to be cast directly in the tool core. In the illustrated implementation, the radial guide features 214 in the hinge frame 108(1) are female, which enables the radial guide features to have the largest possible radii.

As mentioned briefly above, the split hinge frame 108(1) can enable a stronger hinge frame, since the split hinge frame can enable the ability to add (and/or retain) material in areas not possible in a one-piece hinge frame. The split hinge frame makes it possible to make the guide slot 222 'blind' (slot does go all the way though, but ends in a solid wall). The blind slot greatly strengthens this area of the hinge frame, allowing significant reduction in z-height.

In this design, the frame supports 208 are not interconnected to one another and instead are separate and distinct components positioned on opposing ends of the friction pin and not extending toward one another along a length of the friction pin. The frame supports are prevented from collapsing by using hook features (e.g., support hooks 218) in the hinge frame 108(1). The support hook 218 in the hinge frame 108(1) also doubles as a support stopper, preventing the support from rotating out of the frame. The support hook does this without requiring any additional width in the x-direction and/or height in z direction that would be associated with interconnecting the frame supports. Stated another way, the hinge arm 110(1) is sandwiched by the frame supports 208, which are themselves sandwiched by the hinge frame. However, the frame supports do not extend toward one another between the hinge frame 108(1) and the hinge arm 110(1) (in the x-reference direction) in a manner that contributes to thickness in the z-reference direction.

As illustrated in FIG. 2G, in this implementation, the band 202 inside diameter no longer needs to be co-located with the band outside diameter. This can allow variable wall thickness of the band 202 around the friction pin 204. For instance, width $W_1$ is greater than width $W_2$ which is greater than width $W_3$. This ability to vary the width optimizes the stress in the band such that any areas of high stress are equalized with areas of low stress, allowing the high and potentially maximum strain energy and friction from the band. This benefit can be used to reduce the overall band diameter and therefore z-height required for the hinge assembly 108(1). It could also be used to reduce x-width required to achieve the desired torque for rotation of the band 202 around the friction pin 204. The area of band thin wall (e.g. $W_3$) can be carefully chosen such that the friction pin 204 can be placed at the maximum possible radius, which can optimize the location of the radial guiding features on the hinge arm 110(1). Stated another way, a friction pin end of the band 202 can define a passage 240 (FIGS. 2D and 2G). The friction pin 204 is elongate and extends along a first central axis CA1 (see FIG. 2G) through the passage 240 into the hinge arm 110(1). The first central axis can correspond to a central axis of an inside diameter of the friction pin end. An outside diameter of the friction pin end of the band can define a second central axis CA2 (see FIG. 2G) that is offset from the first central axis. This asymmetry can allow for an offset in space, and better balance the stress distribution around the band. Alternatively or additionally, the asymmetry can enhance and potentially optimize friction torque versus band stress.

The radial guiding features, such as radial guide features 216 on the hinge arm 110(1) can be uniform. In other implementations, the radial guide features, such as radial guide features 216 may only constrain the components together over a limited portion of their respective arcs. For instance, as indicated in FIG. 2D radial guide feature 216(2) has raised areas 232 and 234. The remaining portions 236 and 238 of the arcs have extra clearance to ensure that the radial constraint is always controlled by the limited raised areas. This configuration can reduce the likelihood of binding between the radial guide features of the hinge frame 108(1), frame supports 208, and/or hinge arm 110(1).

In this implementation, the radial constraints between the hinge frame 108(1) and the frame supports 208 occurs over relatively small arcs with contact occurring between the support hook of the hinge frame and the frame supports 208 with other areas of the arcs not making direct contact to avoid binding. Similarly, contact between the frame supports 208 and the hinge arm 110(1) occurs between raised areas 232 and 234 of the hinge arm 110(1) and radial guide feature 216 of frame supports 208. In this case, raised area 232 primarily constrains in the z-direction and raised area 234 primarily constrains in the y-direction.

Stated another way, the limited regions of radial constraints can allow the clearance between these features to be much smaller and still allow free motion. If the radial constraints span the entire arc (nearly 180 degrees), then the clearances must be greater to prevent over-constraint when the hinge is fully closed. This is particularly true in the y-reference direction, as there would effectively be y-constraints on both ends of the arcs. Smaller clearances between radial constraints tends to be desired because it limits the free play of the hinge assembly and therefore the kickstand.

Transitioning to FIGS. 3A-3E shows relative rotation of the hinge arm 110(1) relative to the hinge frame 108(1). In this case, the relative rotation is about 90-degrees when compared to the closed orientation of FIGS. 2A-2G. In this implementation, the rotation is achieved by about 45 degrees of rotation of frame supports 208(1) relative to the hinge frame 108(1). The hinge arm 110(1) travels with the frame supports 208 and also rotates another 45 degrees relative to the frame supports, resulting in the 90 degrees of total rotation between the hinge arm 110(1) and the hinge frame 108(1).

FIGS. 4A-4E show the hinge assembly 108(1) in the fully open orientation of about 150 degrees of rotation relative to the closed orientation of FIGS. 2A-2G. As mentioned above, the rotation is two-fold with the frame supports 208 rotating relative to the hinge frame 108(1) and the hinge arm 110(1) rotating relative to the frame supports 208. The guide pin 206 travels in the slots 222 during rotation to steady hinge function. Rotation stops at the fully open orientation when the support hooks 218 contact the support stoppers 220.

Figure 4A:
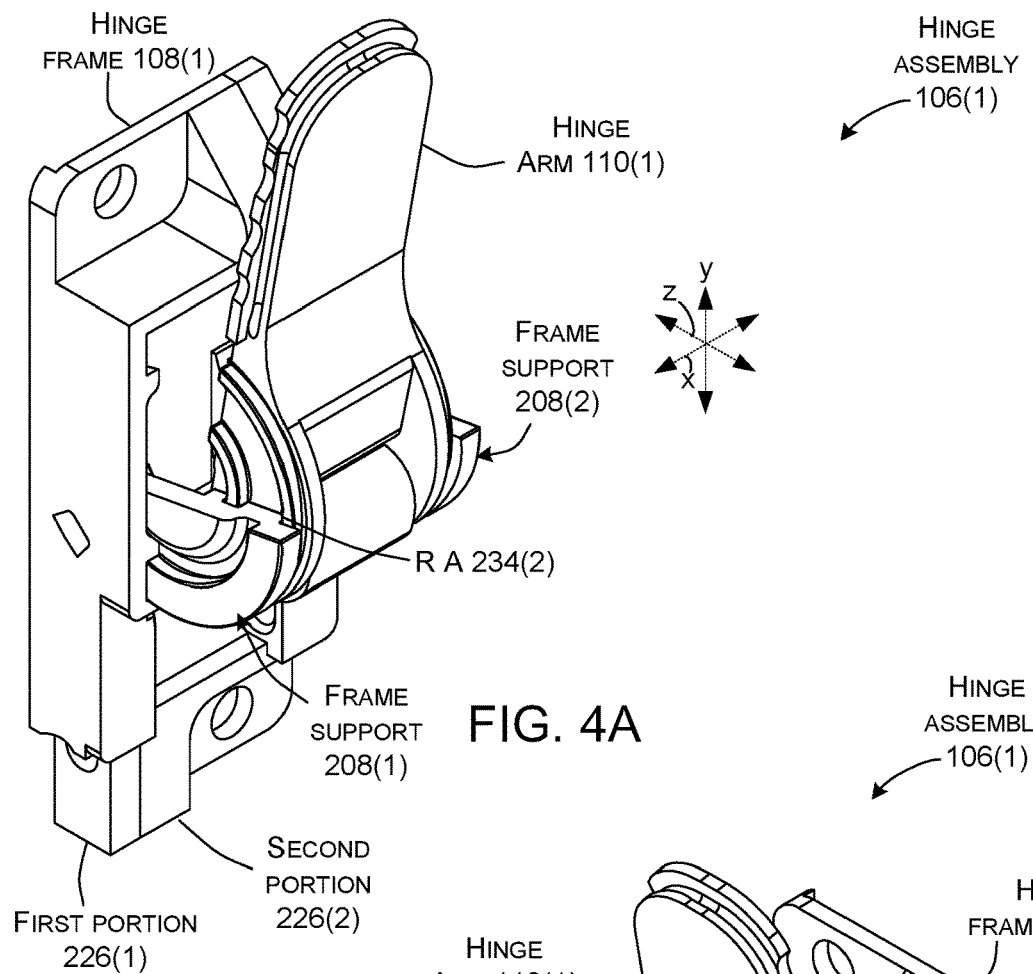
Figure 4B:
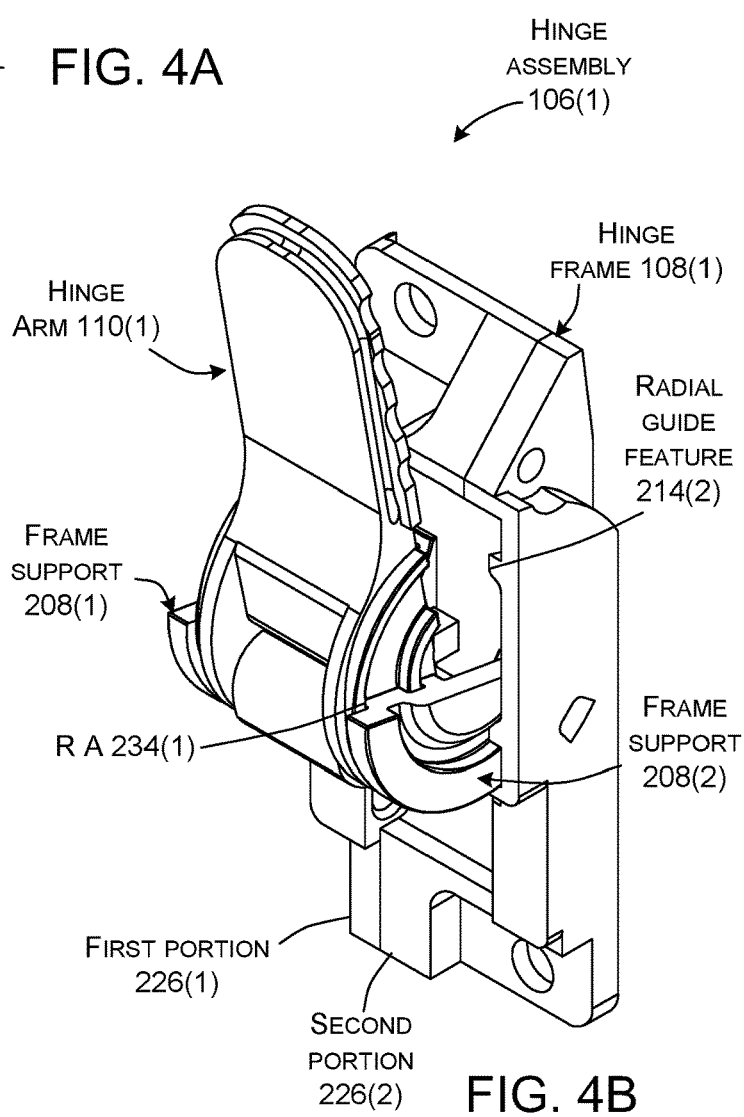
Figure 4C:
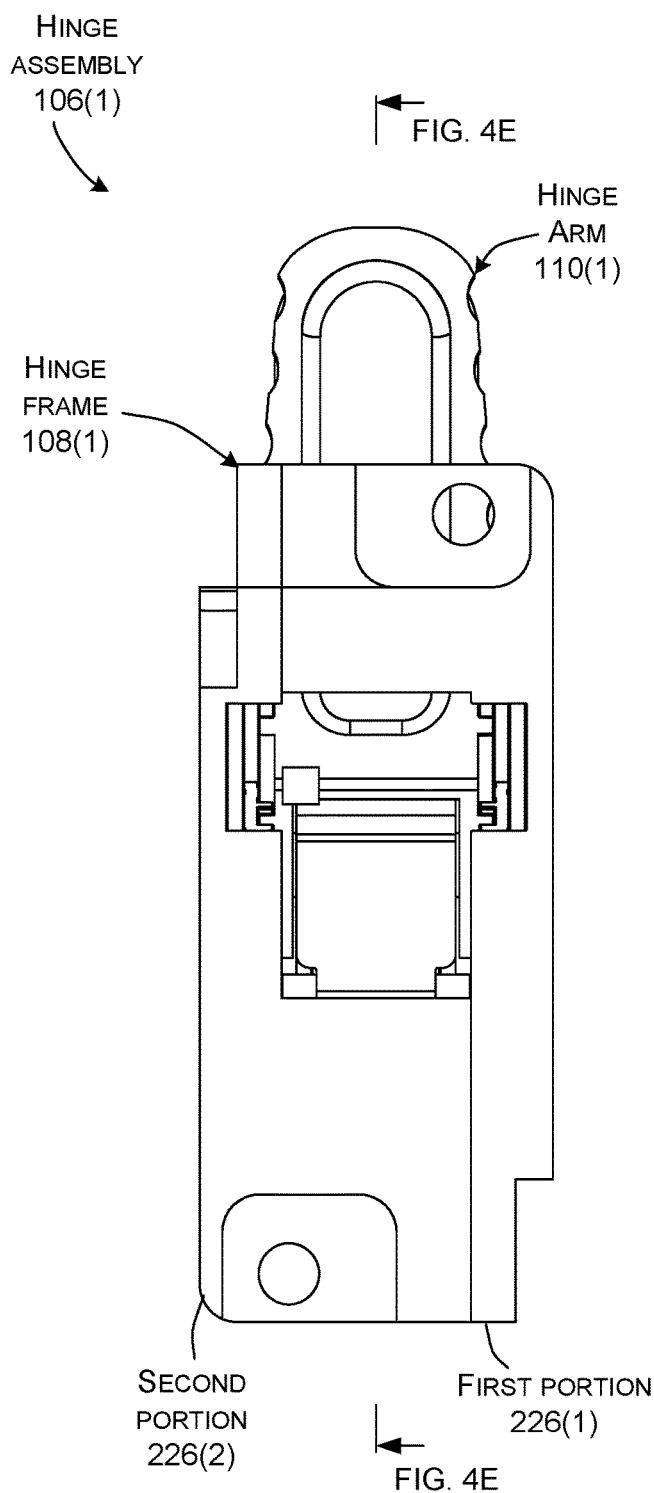
Figure 4D:
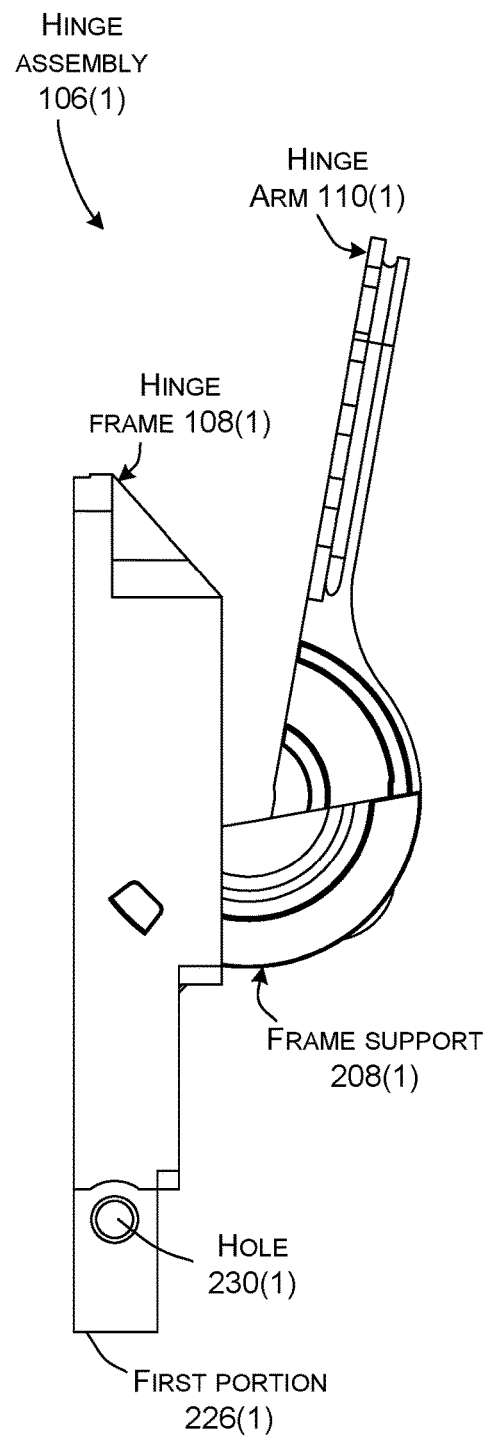
Figure 4E:
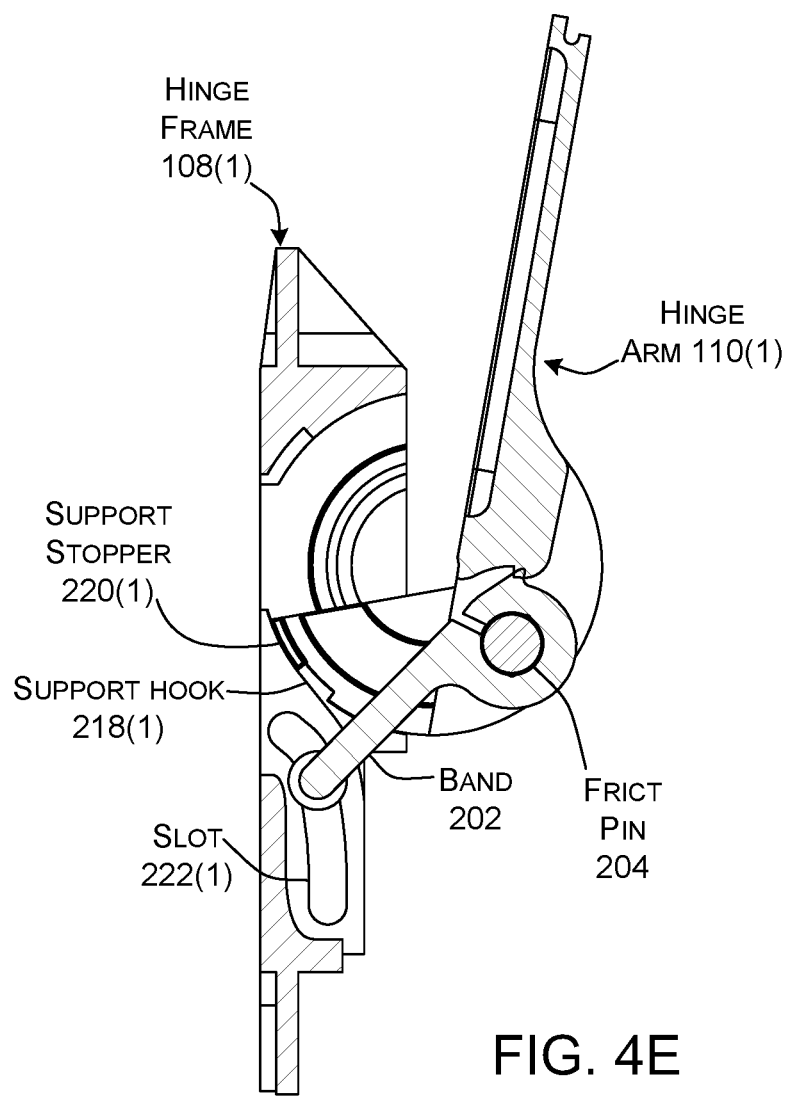

The fully open orientation tends to be the worst case for both hinge strength and free play, so it can be important to maintain maximum engagement. FIGS. 4A, 4B, and 4E show how in some implementations, the location of the constraint regions is carefully chosen such that no engagement is lost when the hinge is fully open. For instance, FIGS. 4A and 4B show the raised areas 234 of the hinge arm engaging the frame supports 208.

Individual elements of the hinge assemblies 106 can be made from various materials, such as metals, plastics, foams, polymers, and/or composites. These materials can be prepared in various ways, such as in the form of sheet metals, die cast metals, machined metals, 3D printed materials, molded or 3D printed plastics, and/or molded or 3D printed composites, among others, or any combination of these (and/or other) materials and/or preparations can be employed.

The present hinge assembly concepts can be utilized with any type of device, such as but not limited to notebook computers, smart phones, wearable smart devices, tablets, and/or other types of existing, developing, and/or yet to be developed devices.

Various methods of manufacture, assembly, and/or use for hinge assemblies and devices are contemplated beyond those shown above relative to FIGS. 1-4E.

Various examples are described above. Additional examples are described below. One example includes a device comprising a first portion and a second portion that are rotatably coupled by a hinge assembly and the hinge assembly comprises a hinge frame secured to the first portion and a hinge arm secured to the second portion. The hinge frame rotatably secured to the hinge arm by a band extending between a guide pin retained in the hinge frame and a friction pin secured to the hinge arm. The guide pin retained in the hinge frame by opposing blind guide slots and the guide pin having a diameter that can be greater than or equal to a thickness of the band intersecting the guide pin.

Another example can include any of the above and/or below examples where the first portion comprises a tablet and the second portion comprises a kickstand.

Another example can include any of the above and/or below examples where the first portion includes a display and the second portion includes another display.

Another example can include any of the above and/or below examples where the device comprises first and second frame supports positioned between the hinge frame and the hinge arm.

Another example can include any of the above and/or below examples where the first and second frame supports define opposing first and second radial guide features and wherein the hinge arm defines outwardly-facing radial guide features that correspond to the first radial guide features, and wherein the hinge frame defines inwardly-facing radial guide features that correspond to the second radial guide features.

Another example can include any of the above and/or below examples where the inwardly-facing radial guide features of the hinge frame include support hooks that extend over and capture the frame supports and allow rotation of the frame supports while preventing tipping of the frame supports.

Another example can include any of the above and/or below examples where the frame supports define support stops that engage the support hooks to define a range of rotation between the hinge frame and the hinge arm.

Another example can include any of the above and/or below examples where the outwardly-facing radial guide features of the hinge arm include raised areas and the first radial guide features of the first and second frame supports only contact the raised areas of the outwardly-facing radial guide features during rotation of the first and second portions between a closed orientation and an open orientation.

Another example can include any of the above and/or below examples where the hinge frame comprises first and second portions that are secured together to capture the hinge arm and the frame supports therebetween.

Another example can include any of the above and/or below examples where sidewalls of the first and second portions are continuous and without features formed therethrough.

Another example can include any of the above and/or below examples where sidewalls of the first and second portions prevent the guide pin from passing therethrough.

Another example can include any of the above and/or below examples where the guide pin comprises a portion of the band.

Another example can include any of the above and/or below examples where the guide pin and the band comprise a single integral component.

Another example includes a device comprising a tablet and a kickstand that are rotatably coupled by a hinge assembly and the hinge assembly comprises a hinge frame secured to the tablet and a hinge arm secured to the kickstand. The hinge assembly further comprising first and second frame supports interposed between the hinge arm and the hinge frame. The first and second frame supports defining first radial guide features that interact with outwardly-facing radial guide features of the hinge arm and second radial guide features that interact with inwardly-facing radial guide features of the hinge frame to define rotation of the hinge arm relative to the hinge frame. The hinge frame further defining support hooks that capture the frame supports to allow radial rotation of the frame supports and prevent other movement of the frame supports.

Another example can include any of the above and/or below examples where the frame supports define support stops that interact with the support hooks to define a range of rotation between the hinge frame and the hinge arm.

Another example can include any of the above and/or below examples where the device further comprises a friction pin retained by the hinge arm and wherein the frame supports are separate and distinct components positioned on opposing ends of the friction pin and not extending toward one another along a length of the friction pin.

Another example includes a device comprising a first portion and a second portion that are rotatably coupled by a hinge assembly and the hinge assembly comprising a hinge frame secured to the first portion and a hinge arm secured to the second portion, the hinge frame rotatably secured to the hinge arm by a band extending between a guide pin end and a friction pin end, the guide pin end including an integral guide pin that is slideably retained in the hinge frame, the friction pin end defining a passage that receives a friction pin that extends along a first central axis through the passage into the hinge arm, the guide pin end defining a second central axis that is offset from the first central axis.

Another example can include any of the above and/or below examples where the second central axis is defined by an outside diameter of the friction pin end of the band.

Another example can include any of the above and/or below examples where the integral guide pin is slideably retained in the hinge frame by a pair of opposing elongate slots defined by the hinge frame.

Another example can include any of the above and/or below examples where the pair of opposing elongate slots are linear, the pair of opposing elongate slots are curvilinear, or the pair of opposing elongate slots comprise multiple linear segments connected by transition regions.

Although techniques, methods, devices, systems, etc., pertaining to hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

The invention claimed is:

1. A device, comprising:
a first portion and a second portion that are rotatably coupled by a hinge assembly; and,
the hinge assembly comprising:
a hinge frame secured to the first portion and a hinge arm secured to the second portion, the hinge frame rotatably secured to the hinge arm by a band extending between a guide pin retained in the hinge frame and a friction pin secured to the hinge arm, the guide pin retained in the hinge frame by opposing blind guide slots; and
a first frame support and a second frame support positioned between the hinge frame and the hinge arm, each of the first frame support and the second frame support defining a first radial guide feature that interacts with an inwardly-facing radial guide feature of the hinge frame, and a second radial guide feature that interacts with an outwardly-facing radial guide feature of the hinge arm.

2. The device of claim 1, wherein the first portion comprises a tablet and the second portion comprises a kickstand.

3. The device of claim 1, wherein the first portion includes a display and the second portion includes another display.

4. The device of claim 1, wherein the inwardly-facing radial guide feature of the hinge frame includes a support hook that extends over and captures the first frame support and allows rotation of the first frame support while preventing tipping of the first frame support.

5. The device of claim 4, wherein the first frame support defines a support stop that engages the support hook to define a range of rotation between the hinge frame and the hinge arm.

6. The device of claim 1, wherein the outwardly-facing radial guide feature of the hinge arm includes raised areas and the first radial guide feature of the first frame support only contacts the raised areas of the outwardly-facing radial guide feature during rotation of the first and second portions between a closed orientation and an open orientation.

7. The device of claim 5, wherein the hinge frame comprises first and second portions that are secured together to capture the hinge arm and the frame supports therebetween.

8. The device of claim 7, wherein sidewalls of the first and second portions are continuous and without features formed therethrough.

9. The device of claim 7, wherein sidewalls of the first and second portions prevent the guide pin from passing therethrough.

10. The device of claim 1, wherein the guide pin and the band comprise a single integral component.

11. A device, comprising:

a first portion and a second portion; and, a hinge assembly that rotatably couples the first and second portions, the hinge assembly comprising:

a hinge frame secured to the first portion and a hinge arm secured to the second portion, and first and second frame supports interposed between the hinge arm and the hinge frame, the first and second frame supports each defining a first radial guide feature that interacts with opposing outwardly-facing radial guide features of the hinge arm, the first and second frame supports also each defining a second radial guide feature that interacts with opposing inwardly-facing radial guide features of the hinge frame to define rotation of the hinge arm relative to the hinge frame.

12. The device of claim 11, wherein the second portion comprises a kickstand.

13. The device of claim 11, further comprising a friction pin retained by the hinge arm and wherein the first and second frame supports are separate and distinct components positioned on opposing ends of the friction pin and not extending toward one another along a length of the friction pin.

14. A device, comprising:

a first portion and a second portion that are rotatably coupled by a hinge assembly; and, the hinge assembly comprising:

a hinge frame secured to the first portion and a hinge arm secured to the second portion, the hinge frame rotatably secured to the hinge arm, and first and second frame supports positioned on opposite sides of the hinge arm, the first and second frame supports each defining a first radial guide feature that interacts with opposing outwardly-facing radial guide features of the hinge arm, the first and second frame supports also each defining a second radial guide feature that interacts with opposing inwardly-facing radial guide features of the hinge frame.

15. The device of claim 14, wherein the hinge frame is rotatably secured to the hinge arm by a band extending between a guide pin end and a friction pin end, and wherein the guide pin end includes an integral guide pin that is slideably retained in the hinge frame.

16. The device of claim 15, wherein the integral guide pin is slideably retained in the hinge frame by a pair of opposing elongate slots defined by the hinge frame.

17. The device of claim 15, wherein the friction pin end defines a passage that receives a friction pin and the friction pin extends through the passage and into the hinge arm.

* * * * *